Feb. 24, 1959 R. H. FRICKE ET AL 2,875,386
MICROWAVE BYPASS CAPACITOR
Filed Jan. 25, 1955
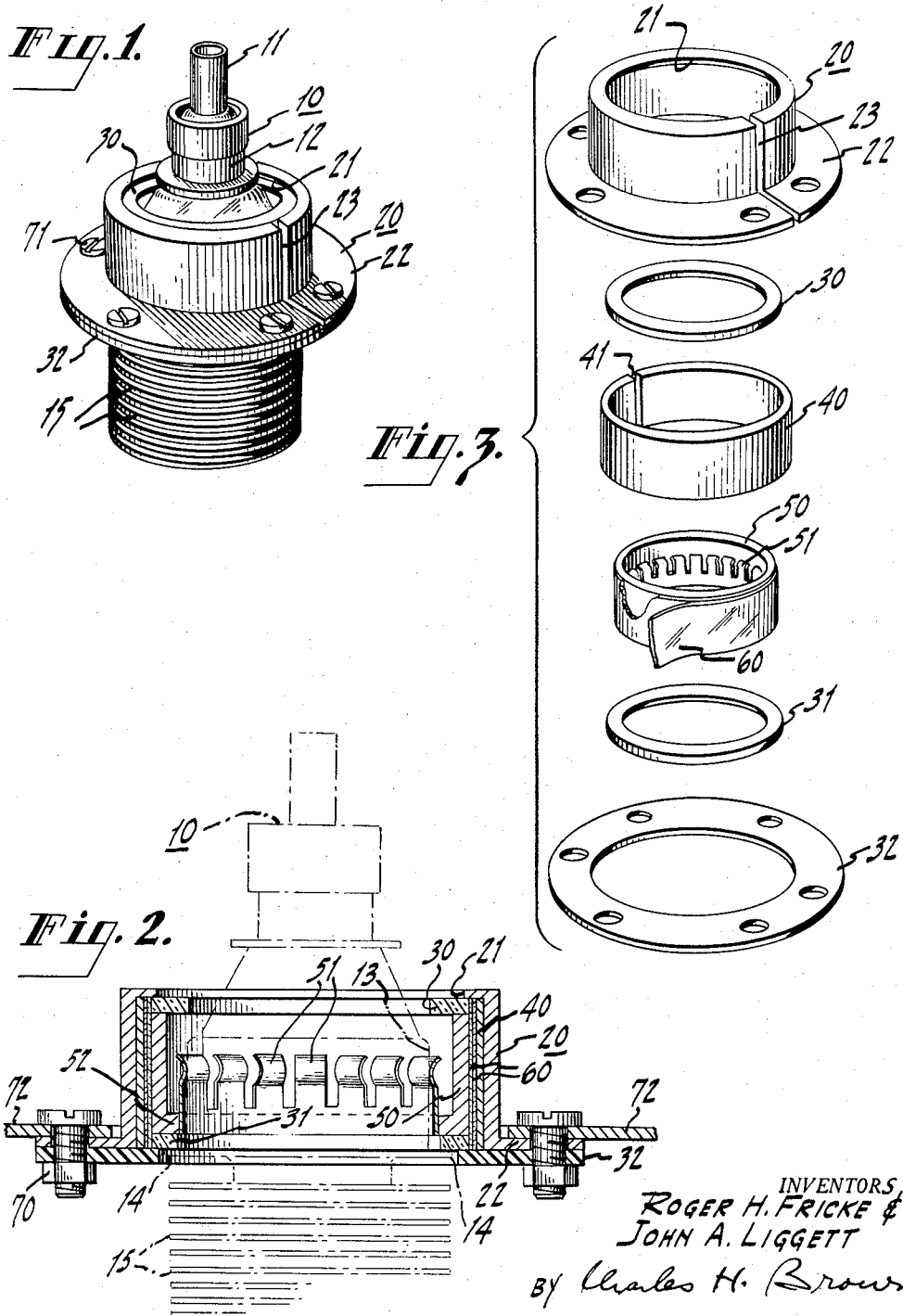
INVENTORS
ROGER H. FRICKE &
JOHN A. LIGGETT
BY Charles H. Brown
ATTORNEY

United States Patent Office 2,875,386
Patented Feb. 24, 1959

2,875,386

MICROWAVE BYPASS CAPACITOR

Roger H. Fricke, Philadelphia, Pa., and John A. Liggett, Haddonfield, N. J., assignors to Radio Corporation of America, a corporation of Delaware Application January 25, 1955, Serial No. 483,878

8 Claims. (Cl. 317—257)

The invention relates to a bypass capacitor for use at microwave frequencies, and particularly to a bypass capacitor suitable for use with a lighthouse type of tube.

In microwave circuitry, it is often desirable or necessary to bypass the microwave energy from an electrode of an electron discharge device, such as a lighthouse tube, similar to the 2C39A, to a resonant cavity. The entire bypass assembly should be completely enclosed and dustproof, and should be easily installed in and removed from the resonant cavity. Furthermore, the assembly should allow the tube to be inserted in and removed from the resonant cavity conveniently. Previously, a flat plate bypass assembly has been used in which one plate of the capacitor consisted of the resonant cavity itself, and the other plate consisted of a plate attached to the anode electrode of the electron discharge tube. A sheet of mica or other dielectric material was inserted between the two plates to form a sandwich-type of capacitor. Such a capacitor had several disadvantages: The flatness of the plates was critical since any air space between them introduced large losses; losses or resonances in the capacitor limited the maximum frequency that was bypassed to about 2000 megacycles; the capacitor was not sealed against dust or replaceable as a unit; and voltage breakdowns were more likely because of mounting holes required in the dielectric material and exposure to dust.

Accordingly, an object of the invention is to provide an improved bypass capacitor assembly for an electrode of an electron discharge device operating at high frequencies.

Another object of the invention is to provide a novel broadband bypass capacitor for an electrode of an electron discharge device operating at microwave frequencies that is enclosed and dustproof, and that is easily installed in and removed from a resonant cavity.

A more specific object of the invention is to provide an improved bypass capacitor assembly for the anode of a lighthouse type of tube adapted to be coupled to a microwave resonant cavity, which is characterized by being enclosed and dustproof, and which permits either the bypass capacitor assembly, the tube, or both to be easily installed in or removed from the resonant cavity.

These and other objects are attained in accordance with the invention by a bypass capacitor having a cylindrical metallic collar adapted to engage the outer surface of the tube electrode to be bypassed. The collar forms one plate of the capacitor, and a ribbon-like strip of dielectric material is wound closely around the outer surface of the collar. A cylindrical metallic ring is positioned concentrically about the collar and dielectric material and holds the dielectric material around the collar by friction. This ring forms the second plate of the capacitor. A flanged ring assembly for mounting the capacitor on a desired object, for example a resonant cavity, is frictionally clamped in a concentric position around the ring. Insulating and sealing washers placed at the ends of the collar, ring, and ring assembly serve to insulate and seal the bypass capacitor assembly.

The invention is explained in detail in the following description with reference to the accompanying drawing, in which:

Fig. 1 shows a perspective view of a capacitor constructed in accordance with the invention and a lighthouse tube mounted in the capacitor;

Fig. 2 shows a sectional view of the capacitor taken along a diameter of the capacitor shown in Fig. 1; and Fig. 3 shows an exploded view of the components used to form the bypass capacitor assembly.

Referring to Fig. 1 and Fig. 2, a bypass capacitor constructed in accordance with the invention and a 2C39A triode lighthouse tube 10 are shown. While designed primarily for the anode of a lighthouse tube that is to be used with a resonant cavity, the capacitor may also be used as a bypass for any electrode that is terminated or brought out on a cylindrical terminal. The electron discharge tube 10 comprises a cathode terminal 11, a grid terminal 12, an anode terminal 13 and flange 14, and anode cooling fins 15. These terminals are cylindrical or circular, the anode terminal 13 having the largest diameter of the three terminals. An outline of the tube 10 is shown by the dashed lines in Fig. 2, in which the anode terminal 13 and the flange 14 of slightly larger diameter can be seen.

The capacitor is mounted by means of a cylindrical metallic ring assembly 20. This assembly 20 includes a retaining flange 21 and a mounting flange 22, and is provided with slot 23 to facilitate assembly of the capacitor. An insulating washer 30 and an insulating sealing washer 32 are also provided.

Fig. 2 shows a sectional view of the capacitor. The mounting flange 22 of the ring assembly 20 is attached to an object 72, such as the wall of a resonant cavity, by nuts 70 and bolts 71 or some other convenient means. The ring assembly 20 holds by friction a metallic cylindrical ring 40 of smaller diameter, and this ring 40 in turn holds by friction a metallic cylindrical collar 50 of still smaller diameter. A ribbon-like strip of dielectric material 60, such as mica, is wound around the collar 50 and insulates the collar 50 from the ring 40. Complete insulation between the collar 50 and other components is ensured by two circular insulating washers 30, 31 and a circular sealing washer 32. These washers 30, 31, 32 and the retaining flange 21 seal the entire bypass capacitor assembly to make it completely enclosed and dustproof. The ring 40 serves as one plate of the capacitor, the collar 50 serves as the other plate of the capacitor, and the material 60 serves as the dielectric. The collar 50 (one plate of the capacitor) is connected to the anode terminal 13 of the tube 10 by resilient metallic spring contact fingers 51 which are fastened around a flange 52 on the inner surface of the collar 50. These fingers 51 are spaced and adjusted so that they make a firm and positive contact with the outer surface of the anode terminal 13, and still allow the tube 10 to be easily inserted or withdrawn from the capacitor assembly. They are mounted so that the flanged portion 14 of the anode terminal 13 cannot pass therethrough, thus preventing the tube 10 from being pushed entirely through the capacitor. The ring 40 (the other plate of the capacitor) is connected to the desired object by the ring assembly 20 and its mounting flange 22. Thus, the anode terminal 13 is capacitively bypassed.

Fig. 3 shows an exploded view of the components which are used to form the capacitor. The components are arranged in the order in which they fit in the ring assembly 20. One insulating washer 30 is positioned in the ring assembly 20 underneath and directly against the retaining flange 21. This insulating washer 30 has an outside diameter which is equal to the outside diameter of the collar 50, and an inside diameter which is less than the inside diameter of the collar 50 but which allows the tube 10 to be inserted in the bypass assembly. The position of the washer 30 is such that it overlies and seals the ends of collar 50. The flange 21 overlies and seals the edges of the strip of dielectric material 60 and also the ring 40. The ring 40 is positioned concentrically within the ring assembly 20 with its upper end underneath and touching the retaining flange 21 so that its slot 41 is approximately 180° away from the slot 23 in the ring assembly 20. These slots 23, 41 facilitate assembly of the capacitor, as will be explained. The collar 50, with the ribbon-like strip of dielectric material 60 wound around it, is positioned concentrically within the ring 40 against the insulating washer 30 and retaining flange 21. The second insulating washer 31 is positioned against the lower end of the collar 50. The second insulating washer 31 has an outside diameter which is also equal to the outside diameter of the collar 50, and an inside diameter which is slightly greater than the inside diameter of the spring fingers 51 and the flange 52, thus ensuring contact between the spring fingers 51 and the anode terminal 13. Finally, the sealing washer 32 of suitable insulating material rests underneath and against the mounting flange 22 of the ring assembly 20. This sealing washer 32 serves to hold the complete assembly together. This sealing washer 32 is of such dimensions as to cover and seal the lower end of the ring 40, the dielectric material 60, and a portion of the second insulating washer 31, and still allow the tube 10 to be inserted into or removed from the capacitor. This is shown clearly in Fig. 2.

In assembling the capacitor, one method which has proved highly satisfactory includes placing the insulating washers 30, 31 against the ends of the collar 50, and then wrapping the strip of dielectric material 60 around the periphery of these three parts. The slot 41 in the ring 40 allows the ring 40 to be expanded slightly and slipped over the dielectric material 60 without damaging it, so as to hold the assembled parts together tightly and uniformly. Then, the ring assembly 20 is pressed over the ring 40, in turn, so that it surrounds the collar 50 and its strip of insulation 60, the slot 23 allowing the ring assembly 20 to be expanded slightly to do so. It is desirable that the two slots 23, 41 be approximately 180° apart to assure that a complete band of metal encircles the dielectric material 60. The capacitor may be easily mounted in any position desired by fastening the mounting flange 22 to the desired object 72, which may, for example, be the wall of a cavity resonator.

In an actual capacitor constructed in accordance with the invention, the ring assembly 20, the ring 40, and the collar 50 were made of silver plated brass. The dielectric material 60 comprised three turns of 0.001 inch thick mica. Three turns were used to protect against imperfections, such as small pin holes, in the material 60. The insulating washers 30, 31 were made of Textolite, and the sealing washer 32 was made of Bakelite. When used with a 2C39A tube, the bypass assembly performed very satisfactorily as a broadband capacitor over a frequency range between 1500 and 3000 megacycles with negligible losses and without any resonances. No breakdown occurred with D.-C. voltages as high as 1500 volts, and since the assembly is completely enclosed and dustproof, this breakdown voltage can be maintained. In addition to allowing tubes to be installed and removed easily, the assembly itself can be easily installed or removed, and can be tested as an integral unit. The brass parts can be machined to close tolerances to give a uniform pressure fit between all parts and eliminate air spaces. Furthermore, the capacitor provides a completely enclosed and sealed unit that prevents dust and foreign material from reaching the vital parts of the capacitor and lowering its breakdown voltage.

What is claimed is:

1. A broadband bypass capacitor for an electron discharge device having its anode terminated on a cylindrical terminal, comprising a metallic cylindrical collar having metallic spring fingers fastened around the inner surface thereof and being adapted to engage the outer surface of said terminal, said collar forming one plate of said capacitor, a ribbon-like strip of dielectric material wound a plurality of times about the outer surface of said collar, a metallic cylindrical ring positioned concentrically about said collar and said dielectric material for frictionally holding said dielectric material around said collar, said ring forming the second plate of said capacitor, a metallic cylindrical ring assembly frictionally clamped concentrically about said ring, said ring assembly having a first circular flange attached around the inner surface of said assembly at one end for retaining said capacitor and a second circular flange attached around the outer surface of said assembly at the other end thereof for mounting said capacitor, a first insulating washer positioned between said first flange and one end of said collar, a second insulating washer positioned at the other end of said collar, and a sealing washer positioned against said second flange and said second insulating washer for sealing said capacitor.

2. A broadband bypass capacitor for an electron discharge device having its anode terminated on a cylindrical terminal, comprising a metallic cylindrical collar having metallic spring fingers fastened around the inner surface thereof and being adapted to engage the outer surface of said terminal, said collar forming one plate of said capacitor, a first circular insulating washer positioned against one end of said collar, said first washer having an outside diameter equal to the outside diameter of said collar and an inside diameter less than the inside diameter of said collar, a second circular insulating washer positioned against the other end of said collar, said second washer having an outside diameter equal to the outside diameter of said collar and an inside diameter greater than the inside diameter of said collar, a ribbon-like strip of dielectric material wound a plurality of times about the outer surface of said collar and said washers, a metallic cylindrical ring positioned concentrically about said dielectric material for frictionally holding said dielectric material around said collar and said washers, said ring forming the second plate of said capacitor, a metallic cylindrical ring assembly frictionally clamped concentrically about said ring, said ring assembly having a first circular flange attached around the inner surface at one end thereof against which said first insulating washer is positioned for sealing said capacitor, and said ring assembly having a second circular flange attached around the outer surface at the other end thereof for mounting said capacitor, and a circular sealing washer positioned against said second flange and said second insulating washer for sealing said capacitor, said sealing washer having an outside diameter equal to the outside diameter of said second flange and an inside diameter greater than the inside diameter of said second washer and less than the outside diameter of said second washer.

3. A bypass capacitor for an electron discharge device having one of its electrodes terminated on a cylindrical terminal, comprising a cylindrical collar adapted to engage the outer surface of said terminal and form one plate of said capacitor, washers positioned at each end of said collar for insulating said collar, a strip of dielectric material wound around the outer surface of said collar, a cylindrical ring positioned concentrically about said dielectric material for frictionally holding said dielectric material around said collar, said ring forming the second plate of said capacitor, a sealing washer positioned at one end of said dielectric material and said ring for sealing said capacitor, and a ring assembly having a retaining flange positioned at the other end of said dielectric material and said ring for sealing and mounting said capacitor.

4. A broadband bypass capacitor for an electron discharge device having one of its electrodes terminated on a cylindrical terminal, comprising a metallic cylindrical collar having resilient metallic spring fasteners around the inner surface thereof to engage the outer surface of said terminal, said collar forming one plate of said capacitor, insulating washers positioned at each end of said collar for insulating said collar, a strip of dielectric material wound around the outer surface of said collar and said insulating washers, a metallic cylindrical ring positioned concentrically about said dielectric material for frictionally holding said dielectric material around said collar, said ring forming the second plate of said capacitor, an insulating washer positioned at one end of said dielectric material and said ring for sealing said capacitor, and a metallic ring assembly positioned concentrically about said ring for sealing and mounting said capacitor, said ring assembly having a retaining flange positioned at and engaging the other end of said dielectric material and said ring.

5. A broadband bypass capacitor for an electron discharge device having one of its electrodes terminated on a cylindrical terminal, comprising a metallic cylindrical collar adapted to engage the outer surface of said terminal and form one plate of said capacitor, insulating washers positioned at each end of said collar for insulating said collar, a ribbon-like strip of dielectric material wound at least once about the outer surface of said collar and said insulating washers, a metallic cylindrical ring positioned concentrically about said collar and said dielectric material for frictionally holding said dielectric material around said collar, said ring forming the second plate of said capacitor, an insulating washer positioned at one end of said dielectric material and said ring for sealing said capacitor, and a metallic circular ring assembly having a retaining flange engaging the other end of said dielectric material and said ring for sealing and mounting said capacitor.

6. A broadband bypass capacitor for an electron discharge device having one of the electrodes terminated on a cylindrical terminal, comprising a metallic cylindrical collar adapted to engage the outer surface of said terminal and form one plate of said capacitor, circular insulating washers positioned at each end of said collar for insulating said collar, a strip of dielectric material wound around the outer surface of said collar and said insulating washers, a metallic cylindrical ring positioned concentrically about said dielectric material and said collar for frictionally holding said dielectric material around said collar, said ring forming the second plate of said capacitor, a circular insulating washer positioned at one end of said dielectric material and said ring for sealing said capacitor, and a metallic ring assembly having a retaining flange engaging the other end of said dielectric material and said ring for sealing and mounting said capacitor.

7. A broadband bypass capacitor for an electron discharge device having its anode terminated on a cylindrical terminal, comprising a metallic cylindrical collar having metallic spring fingers fastened around the inner surface thereof and adapted to engage the outer surface of said terminal, said collar forming one plate of said capacitor, circular insulating washers having an outer diameter substantially equal to the outer diameter of said collar positioned at each end of said collar for insulating said collar, a ribbon-like strip of dielectric material wound a plurality of times about the outer surface of said collar and said insulating washers, a metallic cylindrical ring positioned concentrically about said collar and said dielectric material for frictionally holding said dielectric material around said collar, said ring forming the second plate of said capacitor, a circular insulating washer positioned at one end of said dielectric material and said ring for sealing one end of said capacitor, and a metallic ring assembly positioned concentrically around and adapted to engage said ring for mounting said capacitor, said ring assembly having a flange at one end thereof that extends inwardly across at least the other end of said dielectric material and said ring for sealing the other end of said capacitor.

8. A bypass capacitor for an electron discharge device having one of its electrodes terminated on a terminal, comprising a collar adapted to engage the outer surface of said terminal and form one plate of said capacitor, washers positioned at each end of said collar for insulating said collar, a strip of dielectric material wound around the outer surface of said collar, a ring positioned concentrically about said dielectric material for frictionally holding said dielectric material around said collar, said ring forming the second plate of said capacitor, a sealing washer positioned at one end of said dielectric material and said ring for sealing said capacitor, and a ring assembly having a retaining flange positioned at the other end of said dielectric material and said ring for sealing and mounting said capacitor.

References Cited in the file of this patent

UNITED STATES PATENTS

| | | |
|---|---|---|
| 2,369,177 | Raskhodoff | Feb. 13, 1945 |
| 2,459,332 | McCown | Jan. 18, 1949 |
| 2,625,582 | Heibel | Jan. 13, 1953 |